United States Patent [19]

Mägerle

[11] 4,352,775
[45] Oct. 5, 1982

[54] METHOD AND APPARATUS FOR PRODUCING MOLDED PLASTIC ARTICLES SUCH AS PACKAGING TUBES

[76] Inventor: Karl Mägerle, Im vorderen Erb 1, 8700 Kusnacht, Switzerland

[21] Appl. No.: 165,396

[22] Filed: Jul. 2, 1980

[30] Foreign Application Priority Data

Jul. 12, 1979 [CH] Switzerland ...................... 6502/79

[51] Int. Cl.³ .......................................... B29D 23/04
[52] U.S. Cl. .................................. 264/500; 264/259; 264/294; 264/323; 264/325; 264/DIG. 41
[58] Field of Search ............... 264/323, 325, 294, 500, 264/DIG. 41, 259

[56] References Cited

U.S. PATENT DOCUMENTS

| | | | |
|---|---|---|---|
| 1,751,624 | 3/1930 | Du Brul | 264/500 |
| 3,172,933 | 3/1965 | Flax | 264/325 |
| 3,280,423 | 10/1966 | Voumard | 264/323 |
| 3,330,006 | 7/1967 | Jenkins | 264/DIG. 41 |
| 3,375,553 | 4/1968 | Criss | 264/523 |
| 3,511,845 | 5/1970 | Scalora | 264/323 |
| 3,670,066 | 6/1972 | Valyi | 264/328.7 |

Primary Examiner—James H. Derrington
Attorney, Agent, or Firm—Cushman, Darby & Cushman

[57] ABSTRACT

A blank is formed out of plasticizable, heated plastic by means of an extruding-type material supply head. A somewhat lenticular profiling of the blank is obtained by appropriately controlling a closing member of the material supply head, which is built as a valve cone. When the closing member is closed off against the lower edge of a tube part of the material supply head, the blank is pinched off from the material supply. A flow of air emerging from a ring nozzle serves to ensure complete severance of the blank from the material supply head. After that has been accomplished, the blank enters an open shaping cavity of a die by free fall. By further movement of the die, which is located on a rotary table, the die removes itself from the permanently located material supply head, so that the blank lying in the cavity can be pressed into a molded article by a stamp. Cooling off too much in certain locations on the blank is prevented by the free fall of the blank into the shaping cavity.

6 Claims, 3 Drawing Figures

METHOD AND APPARATUS FOR PRODUCING MOLDED PLASTIC ARTICLES SUCH AS PACKAGING TUBES

BACKGROUND OF THE INVENTION

The invention is concerned with a method and an apparatus for pressing plasticized plastic material into a shaping cavity in order to produce tubes to be used as containers for fluent products.

For producing molded articles consisting of plastic, such as covers or caps for containers, and particularly the production of head pieces for packing tubes, a pressing procedure is known as an alternative to the injection molding procedure. In the pressing procedure, in contrast with the injection procedure, plasticized plastic material is introduced into a shaping cavity to be formed toward and against it, using a limited amount of pressure. Since pressing procedures quite generally can operate with lower temperatures of the plasticized plastic material than injection procedures can use, they have the advantage, in addition to the fact that they use smaller quantities of energy, of having shorter cooling-off times, and as a result the mold can be opened sooner and the cavity-emptying step in the manufacturing can be shortened by that means.

In the familiar pressing procedure, the mold is made out of a die and a shaft, with the shaft aways bearing a tube-shaped tube element made of plastic. One end of this tube-shaped tube element penetrates into the die, together with the shaft, and seals off the shaping cavity at the circumference of the shaft when the mold is closed. The plasticized plastic formed into the shape of a head piece for a tube joins with the edge of the tube-shaped tube element which is penetrating into the mold under the influence of its heat of fusion.

In the familiar procedure, the plasticized plastic is introduced into the die in the shaping cavity, which is still open, through a central opening, by means of a material supply head from the side opposite the shaft, or discharged from the material supply head in the form of a ring. The plasticized material adhering to the material supply head in the form of a ring is stripped off when it is withdrawn from the shaping cavity through the die, and then it continues to adhere to a surface adjoining the shaping cavity until the pressing step takes place.

Defects occur in the container tube products produced in accordance with this known procedure in certain cases, and some of those are perceptible on the surface. An examination of the processes involved in pressing has shown that plastic material which comes into direct contact with the cooled die while being stripped off of the material supply head and is formed by the matrix, with the plastic being next to the die cover over a relatively large surface, can assume a limited crystalline condition in places. As a result of the further cooling which takes place during the pressing process, the remaining heat of fusion obviously no longer suffices, in all cases, to plasticize material again which is already crystallized.

The invention is based on the realization that, when the plasticized material is stripped off of the material supply head, a contact with the cooled matrix involving a comparatively large surface can come about, and that contact results in a comparatively great cooling off in that area of contact until the mold is closed and the plastic is pressed.

SUMMARY OF THE INVENTION

It is the basic task of the invention to describe a procedure in which a premature crystallization of plasticized material can be avoided to a great extent without increasing the temperature of the plastic being discharged from the material supply head, and apparatus for use in carrying out that procedure.

By means of the free fall of the blank, where the distance fallen should be as short as possible, stripping off the heated plastic on cold surfaces is avoided. As a result, it is possible to prevent, to a sufficient extent, the blank made of plastic from cooling off too much at certain locations on it.

In a preferred embodiment of the procedure being described, the blank can be made ring-shaped by a material supply head. Furthermore, the blank can be separated from the flow of material by the material supply head and released from the material supply head by a flow of gas. As a result of the separation of the flow of material by the material supply head itself, the plastic does not come into contact with any cooled surface at all before the free fall, since the material supply head will have at least almost the same temperature as the heated plastic. The separation of the blank from the flow of material by the material supply head can be accomplished by squeezing it off, for example. Then the flow of gas can only serve to release the blank from the material supply head at a specific time, since the flow of gas starts suddenly and only the last few filaments of the material still have to be separated by it. In this process, the flow of gas is preferably directed obliquely downward toward the line dividing the material supply head and the blank.

In another preferred embodiment, a closing member of the material supply head, which has a ring nozzle, can be controlled during the flow of material to form a predetermined profiling of the ring-shaped blank. The controlling can preferably be accomplished in such a way that the blank gets a lenticular profile. By means of such a profile, which resembles a standing oval, the surface with which the blank impinges upon the cooled pressing die is kept as small as possible.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
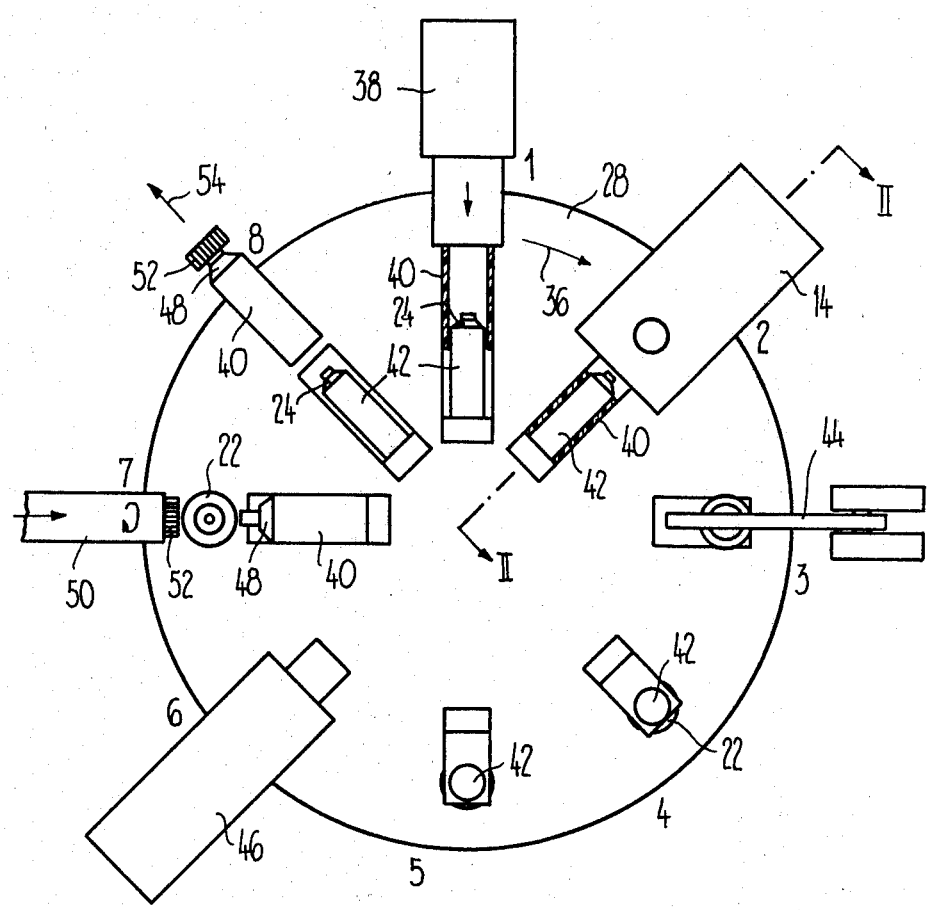
FIG. 1 shows in simplified plan view a squeezing molding machine with pressing dies located on a rotary table.

FIG. 1 shows the rotor constructed as a rotary table 28, in plan view. Dies 22 and stamps 24 distributed at equal intervals from each other in the peripheral direction are located on the rotary table 28, with a stamp 24 being assigned to each die 22. The dies 22 are directed upward, open, and the stamps 24 are located on the rotary table 28 so that they can rotate from a horizontal position through an angle of 90° into a vertical position which is coaxial with the corresponding die 22. In the coaxial position, the stamps 24 are capable of being moved axially in order to be able to close the dies 22 assigned to them and open them again.

Eight work-station positions are indicated with the digits 1 through 8 in FIG. 1, for example, with the rotary table 28 being capable of being propelled one work-station's worth of angular distance at a time in the direction of the arrow, by conventional indexing drive means which are not shown.

In the following, the eight work-station positions will be described in detail.

Station 1

By means of a loading device 38, a prefabricated, tube-shaped tube element 40, which is represented here in section, is pushed onto a shaft 42 comprising the stamp 24. The shaft 42, in that process, is in a horizontal position, so that the charging takes place in a horizontal direction.

Station 2

Figure 2:
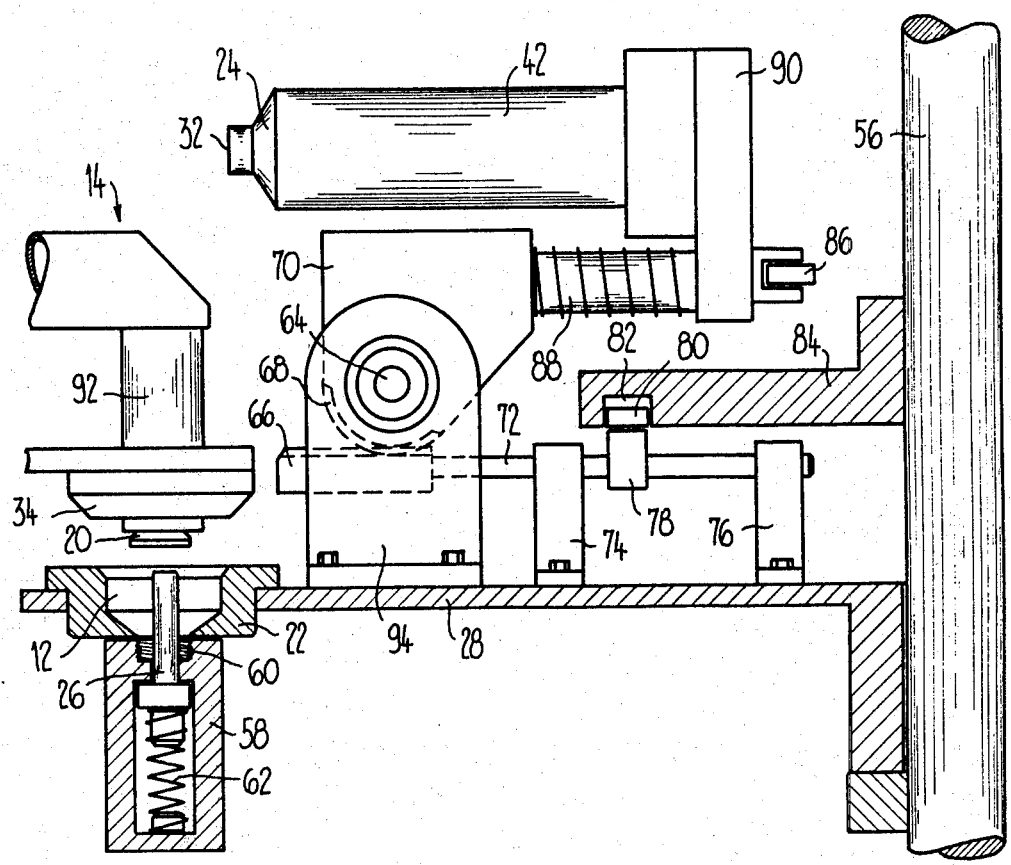
FIG. 2 shows in fragmentary elevation, part of the rotary table with one of the pressing dies, partially in section along the line II—II of FIG. 1.
Figure 3:
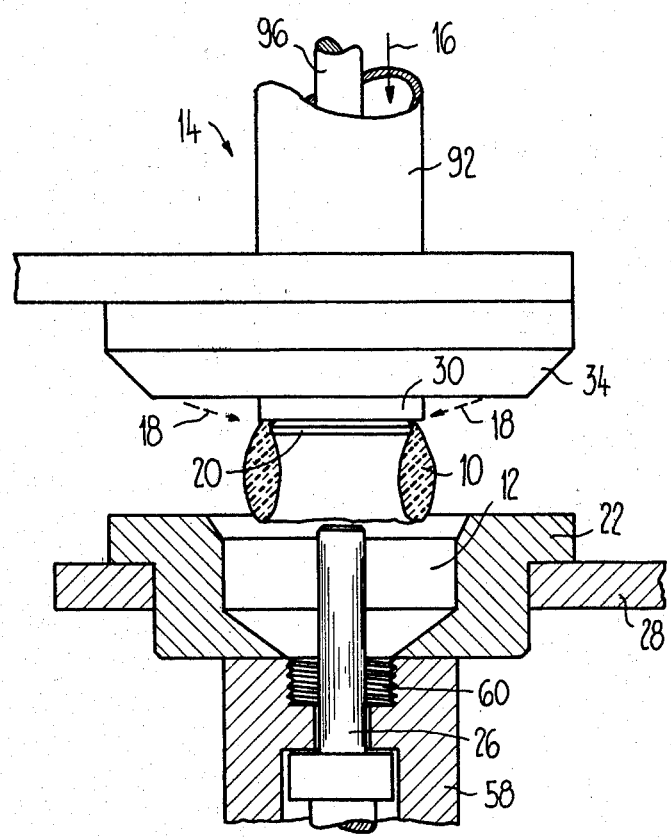
FIG. 3 shows the matrix of the pressing die represented in section to a larger scale than in FIG. 2, with a blank formed by the material supply head before separation.

An extruding-type material supply head 14, which is described in greater detail with the help of FIGS. 2 and 3 is assigned to Station 2. Plasticizable, heated plastic is introduced by the material supply head into the open die covered by the material supply head.

The situation of the die 22 can be seen at station 7. When moving step-by-step from station 2 to station 3, the shaft 42 is swung into the vertical position which is coaxial with the die.

Station 3

By means of an elbow lever 44 assigned to this Station 3, the shaft 42 is introduced into the die with the stamp 24 in the position which is coaxial with the die, in order to press the plasticizable plastic with which the die was filled at Station 2 into a tube head piece, in which process that tube head piece is simultaneously fused to the tube-shaped tube element 40. By conventional means which are not shown, the shaft 42 is fixed in this squeezing position, and it remains in that position when the elbow lever 44 is withdrawn again.

Station 4

The shaft 42 remains in the squeezing position so that the pressed tube head piece/tubular sidewall unit can cool off and the plastized plastic material harden. The die 22 and the shaft 42 are cooled by a conventional cooling medium through connections which are not shown.

Station 5

The shaft 42 continues to remain in the squeezing position to cool off the plasticized plastic material of the tube head piece.

Station 6

By means of a withdrawing device 46, the shaft 42 is withdrawn again in the axial direction and the pressing tool which consists of the die 22 and the stamp 24 is opened again by that process. The part of the die 22 containing the coil is unscrewed underneath the rotary table 28 by means which are not shown. When moving step-by-step from position 6 into position 7, the shaft 42 is swung back into the horizontal position with the tube pipe 40 and the shaped tube head piece 48.

Station 7

By means of a screwing-on device 50 assigned to this station, a tube cover 52 is screwed onto the tube head piece 48.

Station 8

The tube consisting of the tube-shaped tube element 40, the tube head piece 48 and the tube cover 52 is now finished and is ejected in the direction indicated by the arrow 54 or withdrawn from the shaft 42 e.g. by a conventional device which is not shown. After the next step, the shaft 42 is loaded again with a new, tube-shaped tube element 40 at Station 1.

Although eight stations were described in the present embodiment, it is also possible to distribute the corresponding working operations among another number of stations—to ten stations, for instance. By means of the shafts 42 and stamps 24 following the rotary table 28, the cooling-off process can be extended to more than one station with the pressing tools 22 and 24 closed. Such an arrangement is especially advantageous because the time required to move step-by-step from one station to the following one is not tied to the longer-lasting cooling-off process. For that reason, such an arrangement is more economical than one in which the stamps or dies are not assigned permanently to a station to run with it.

FIG. 2 shows a fixed shaft 56 around which the rotary table 28 is fixed so that it can rotate and is driven step-by-step by means which are not shown. The die 22 having the shaping cavity 12 is admitted into the rotary table 28 and fastened. The shaping cavity 12 corresponds to the outer limitation of the tube head piece 48 (FIG. 1). Underneath the die 22 and coaxial with it is another die part 58, in which another shaping cavity 60 for forming the threads on the tube head piece is located. A pin 26, urged in the axial direction by a spring 62 is fixed so that it can move axially, in the other die part 58. The pin 26 is urged in the direction of the shaping cavity 12 of the die 22 by the spring 62, and when the stamp 24 is introduced into the die 22 it is pushed back against the force of the spring 62. The pin 26 serves to keep the tube neck opening free when the tube head piece is being pressed.

The die part 58 is arranged so that it can rotate around its axis in order to be able to free the threads of the tube head piece when the pressing of it has been completed. It is rotated for that purpose by any suitable means which are not shown.

The shaft 42 which has the stamp 24 is arranged so that it can rotate around an axis 64. A spur rack 66 whose teeth engage in a gear-tooth system 68 of a sluing part 70 serves to swing it. The spur rack 66 is connected to a plunger 72 which is supported by two bearing blocks 74 and 76 on the rotary table 28 so that they can be moved axially. Between the bearing blocks 74 and 76, the plunger 72 is connected rigidly with a follower 78 which has a guide roller 80 which is led in a guide groove 82. The guide groove 82 is located in an annular guide flange 84 which cannot rotate with the shaft 42 and therefore is connected with the fixed shaft 56. The guide groove 82 extends in the guide flange 84 in such a way that, at positions corresponding to the Stations 3 through 6 (FIG. 1), it has a rather small radius around the fixed shaft 56. The larger radius of the guide groove 82 represented in FIG. 2 corresponds to the Stations 7, 8, 1 and 2.

When transferring to the smaller radius of the guide groove 82, the follower 78 is moved by it and the plunger 72 and the spur rack 66 are moved by the guide roller 80 in the direction of the shaft 56. By means of the engaging of the spur rack 66 in the gear-tooth system 68 of the sluing part 70, the latter is swung in the vertical position, along with the shaft 42, so that the shaft 42 is in a position which is coaxial with the die 22. In that connection, it should be noted that the material supply head 14 already mentioned in FIG. 1 is only assigned to Station 2.

The elbow lever 44 (FIG. 1) assigned to Station 3 urges a roller 86 in that station through which a shaft 88 running axially in the sluing part 70 is moved in the direction of the die 22, together with a shaft supporter 90 and the shaft 42 held by it, as well as the stamp 24, to close the shaping cavity 12 located in the die 22. As has been mentioned previously in the description in connection with FIG. 1, the stamp 24, along with its supporting elements 42, 90, 88, is held with a catch, for example by means which are not shown, in the last position described.

The material supply head 14 is assigned to Station 2 permanently. It has a tube part 92 in which there is a closing member 20. That closing member 20 is built as a valve cone and arranged so that it can be moved axially by any suitable means which are not shown, to open and close.

The tube part 92 is surrounded by a ring nozzle 34 which is intended to produce a stream of gas which will be described in greater detail with the help of FIG. 3.

The swinging spindle 64 is located in a bearing block 94 connected with the rotary table 28.

FIG. 3 shows a detail from FIG. 2 on a larger scale. In that figure, a blank 10 is shown which was formed by the material supply head 14. The blank 10 is somewhat lenticular in profile. That shape was obtained by controlling the closing member 20 at a constant pressure of the flow of material in the direction 16. When the closing member 20 is closed toward the tube end 30 of the tube part 92, the blank 10 is separated from the flow of material 16, and, in particular, it is squeezed or pinched. However, to release the blank 10 completely from the material supply head 14, a stream of gas 18 is directed through the ring nozzle 34 at the dividing line between the material supply head 14 and the blank 10. That flow of gas 18 is preferably a stream of air which comes into play with a brief blast to release the blank 10 from the material supply head 14 at a precisely determined time. When that has been accomplished, the blank 10 falls into the shaping cavity 12, surrounding the pin 26. The lenticular profile of the blank 10 is especially advantageous because the surface of the blank 10 which is in contact with the die 22 is relatively small as a result of that, and consequently a cooling-off of a large amount of the surface of the blank is avoided by that means. The die 22, and also the stamp 24 (FIG. 2) in appropriate instances, are cooled by means of a cooling medium through an arrangement which is not shown in order to obtain a cooling-off of the tube head piece 48 (FIG. 1) as quickly as possible after the pressing of the blank 10 is completed.

Although the production of a packing tube made of plastic has been described in the above example, it is possible, with a similar piece of apparatus and using a similar procedure, to produce other molded articles from plastic in the same way.

By means of the arrangement of the die 22, which is open at the top, and of the pin 26 which is standing in it, one makes sure that the blank 10 falls into the shaping cavity 12 in a predictable position and is practically unable to slip any longer in that position. The distance it falls between the material supply head 14 and the shaping cavity 12 should be kept as small as possible. If a satisfactory separation of the blank from the material supply head is ensured, the gas jet 34 can be omitted.

A plunger 96 of the closing member 20 is shown, by means of which the closing member 20, which is built as a valve cone, is activated by means which are not shown.

It should now be apparent that the method and apparatus for producing molded plastic articles such as packaging tubes as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. In a method producing a molded article from thermoplastic material in which during the extrusion of plasticized material from an extrusion head a blank is formed, transferred into an upwardly open mold cavity and formed into the shape of the molded article by pressing while the mold is being closed; the steps of:
   (a) extruding at the extrusion head plasticized material in an annular flow;
   (b) shaping the extruded plasticized material into an annular blank of lenticular, standing oval-resembling longitudinal cross-sectional profile, at least in part by controlling said annular flow, while permitting the extruded material to freely depend from the extrusion head;
   (c) separating the blank, so shaped, from the extrusion head at least in part by terminating the flow; and
   (d) permitting the separated blank to free fall into the mold cavity, the mold cavity including an axially directed pin, and the annular blank free falling so as to ring said pin while landing in said mold cavity whereby surface contact with the mold cavity is kept as small as possible; and
   (e) forming a molded article from the deposited annular blank by pressing the deposited annular blank while closing the mold cavity.

2. The method of claim 1, wherein:
said separating of said blank from said supply is accomplished with the aid of a blast of gas aimed to cross said material where said blank is extruded from said extrusion head.

3. The method of claim 2, wherein:
said blast of gas is aimed in a circle, obliquely radially toward and axially away from where the blank is extruded from the extrusion head.

4. The method of claim 1, further including:
utilizing a stamp at least in part to accomplish said pressing; and
leading heat away from the molded article while said mold cavity is closed, by artificially cooling at least one of said mold cavity and said stamp.

5. The method of claim 1, further comprising:

utilizing a stamp at least in part to accomplish said pressing; and interposing a piece of prefabricated plastic material between said stamp and said blank before pressing the stamp against the blank, so that as the stamp is pressed against the blank, the piece of prefabricated plastic material is integrated with the molded article.

6. The method of claim 5, wherein:

the mold cavity is of a shape to produce a container tube head piece from said blank; and the piece of prefabricated plastic material is of a tubular shape to provide a container tube sidewall therefrom when integrated with said container tube head piece.

* * * * *